United States Patent
Zhou et al.

(10) Patent No.: US 9,641,580 B2
(45) Date of Patent: May 2, 2017

(54) DISTRIBUTED STREAM PROCESSING IN THE CLOUD

(71) Applicant: Microsoft Corporation, Redmond, WA (US)

(72) Inventors: Jingren Zhou, Bellevue, WA (US); Zhengping Qian, Shanghai (CN); Peter Zabback, Kirkland, WA (US); Wei Lin, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 357 days.

(21) Appl. No.: 14/320,706

(22) Filed: Jul. 1, 2014

(65) Prior Publication Data

US 2016/0006779 A1  Jan. 7, 2016

(51) Int. Cl.
G06F 17/30 (2006.01)
H04L 29/06 (2006.01)
G06F 11/14 (2006.01)

(52) U.S. Cl.
CPC .......... H04L 65/60 (2013.01); G06F 11/1438 (2013.01); G06F 17/30463 (2013.01)

(58) Field of Classification Search
None
See application file for complete search history.

(56) References Cited

U.S. PATENT DOCUMENTS

| | | | |
|---|---|---|---|
| 8,069,190 B2 | 11/2011 | McColl et al. | |
| 8,595,234 B2 | 11/2013 | Siripurapu et al. | |
| 8,812,487 B2 * | 8/2014 | Krishnamurthy | G06F 17/30445 707/718 |
| 8,935,404 B2 * | 1/2015 | Sirota | G06F 9/485 709/226 |
| 9,298,788 B1 * | 3/2016 | Kekre | G06F 17/30569 |

(Continued)

OTHER PUBLICATIONS

Bruno, et al., "Continuous Cloud-Scale Query Optimization and Processing", In Proceedings of the VLDB Endowment, vol. 6 Issue 11, Aug. 26, 2013, 12 pages.

(Continued)

*Primary Examiner* — Debbie Le
(74) *Attorney, Agent, or Firm* — Fiala & Weaver P.L.L.C.

(57) ABSTRACT

A low-latency cloud-scale computation environment includes a query language, optimization, scheduling, fault tolerance and fault recovery. An event model can be used to extend a declarative query language so that temporal analysis of event of an event stream can be performed. Extractors and outputters can be used to define and implement functions that extend the capabilities of the event-based query language. A script written in the extended query language can be translated into an optimal parallel continuous execution plan. Execution of the plan can be orchestrated by a streaming job manager which schedules vertices on available computing machines. The streaming job manager can monitor overall job execution. Fault tolerance can be provided by tracking execution progress and data dependencies in each vertex. In the event of a failure, another instance of the failed vertex can be scheduled. An optimal recovery point can be determined based on checkpoints and data dependencies.

20 Claims, 4 Drawing Sheets

(56) References Cited

U.S. PATENT DOCUMENTS

| | | | |
|---|---|---|---|
| 2003/0149717 A1* | 8/2003 | Heinzman | G06F 9/5038 718/101 |
| 2010/0293532 A1 | 11/2010 | Andrade et al. | |
| 2012/0297249 A1 | 11/2012 | Yang et al. | |
| 2013/0339473 A1 | 12/2013 | McCaffrey et al. | |
| 2013/0346446 A9 | 12/2013 | Jimenez et al. | |
| 2015/0242483 A1* | 8/2015 | Zhou | G06F 9/5066 707/736 |
| 2015/0379100 A1* | 12/2015 | Vermeulen | G06F 17/30575 707/620 |

OTHER PUBLICATIONS

Binnig, et al., "XDB: A Novel Database Architecture for Data Analytics as a Service", In Proceedings of the 4th annual Symposium on Cloud Computing, Article No. 39, Oct. 1, 2013, 2 pages.

Hummer, et al., "Distributed Continuous Queries OverWeb Service Event Streams", In 7th International Conference on Next Generation Web Services Practices, Oct. 19, 2011, 6 pages.

Cunningham, et al., "Resilient X10: efficient failure-aware programming", In Proceedings of the 19th ACM SIGPLAN symposium on Principles and practice of parallel programming, Feb. 15, 2014, 14 pages.

Wu, et al., "SCOPE Playback: Self-Validation in the Cloud", In Proceedings of the Fifth International Workshop on Testing Database Systems, May 21, 2012, 6 pages.

"Storm", Retrieved on: Apr. 8, 2014, Available at: https://github.com/nathanmarz/storm/wiki.

Akidau, et al., "MillWheel: Fault-tolerant Stream Processing at Internet Scale", In Proceedings of the VLDB Endowment, vol. 6 Issue 11, Aug. 26, 2013, 12 pages.

Ali, et al., "The Extensibility Framework in Microsoft StreamInsight", In Proceedings of the IEEE 27th International Conference on Data Engineering, Apr. 11, 2011, 12 pages.

Condie, et al., "MapReduce Online", In Proceedings of the 7th USENIX conference on Networked systems design and implementation, Apr. 28, 2010, 15 pages.

Qian, et al., "TimeStream: Reliable Stream Computation in the Cloud", In Proceedings of the 8th ACM European Conference on Computer Systems, Apr. 15, 2013, 14 pages.

Zaharia, et al., "Discretized Streams: Fault-tolerant Streaming Computation at Scale", In Proceedings of the Twenty-Fourth ACM Symposium on Operating Systems Principles, Nov. 3, 2013, 16 pages.

Zhou, et al., "Scope: Parallel Databases Meet MapReduce", In the International Journal on Very Large Data Bases, vol. 21 Issue 5, Oct. 2012, 26 pages.

"International Search Report & Written Opinion Received for PCT Application No. PCT/US2015/038407", Mailed Date: Oct. 8, 2015, 12 Pages.

Kamburugamuve, Supun, "Survey of Distributed Stream Processing for Large Stream Sources", Retrieved at <<http://grids.ucs.indiana.edu/ptliupages/publications/survey_stream_processing.pdf>>, Dec. 14, 2013, 16 Pages.

* cited by examiner

DISTRIBUTED STREAM PROCESSING IN THE CLOUD

BACKGROUND

Today many companies rely on the results of cloud-scale data computation to improve service quality, support novel features and detect changes in patterns over time. There is an increasing demand to collect information that will provide business insight in real time. This type of analysis may involve the processing of massive system logs that capture recent processing history and user interactions.

SUMMARY

A cloud-scale computation environment is described which can support distributed low-latency stream processing. The framework includes a query language, optimization, scheduling, fault tolerance and fault recovery. An event model can be used to extend a declarative query language so that temporal analysis can be performed. Stream extractors and stream outputters can be used to define and implement functions that extend the capabilities of the event-based query language. Structured and unstructured datasets can be converted into temporal event streams. A script written in the extended query language can be translated into an optimal parallel continuous execution plan. The execution plan can comprise a directed acyclic graph (DAG) of vertices.

Execution of the plan can be orchestrated by a streaming job manager which schedules vertices on available computing machines. The streaming job manager can monitor overall job execution. All or some portion of the vertices can run concurrently. All or some portion of the vertices can run continuously. Fault tolerance can be provided by tracking execution progress and data dependencies in each vertex. Execution progress can be tracked by performing periodic checkpointing. Sequence numbers can be used to describe and track dependencies between input, output and state of a vertex. In the event of a failure, another instance of the failed vertex can be scheduled. Upon detection of failure of a vertex and associated state loss, state can be recovered by replaying the appropriate history of events. The amount of history that has to be replayed can be reduced by frequently checkpointing state and keeping track of data dependencies using sequence numbers. The optimal recovery point can be determined by using checkpoints and sequence numbers enabling the vertex execution to be resumed with minimal recomputation. The features described can scale linearly to cloud-size, that is, can be scaled to hundreds of computing devices or more, operating with low latency even at high event rates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

One way to process massive amounts of data is to collect logs for a certain period of time and run recurring jobs to process the collected data. This approach inherently incurs a delay from the time an event is generated to the time it is reflected in the output of the query logic. Increasing the frequency at which the job is run can incur prohibitive overhead because, for example, job initiation and cleanup becomes a large consumer of resources. Overhead can also become prohibitive because query logic demands processing events across larger time spans. For example, to understand user behavior reliably, it may be necessary to analyze logs produced over several hours. Each job iteration therefore not only consumes new events but also reads, updates and writes long-term user-specific state. Reading and writing the entire user state for each iteration of a few seconds can become prohibitively expensive.

Another approach relies on a stream database system. Dealing with high volumes of data streams at Internet scale and delivering high throughput can necessitate stream processing to scale transparently to large clusters of hardware. Dealing with the inevitable faults that accompany large clusters without sacrificing latency can be challenging. Recomputation-based failure recovery does not always apply to stream processing because reloading data from the very beginning is infeasible.

In accordance with the subject matter described herein, distributed and continuous stream processing combines benefits from both traditional parallel databases and batch-based recovery execution engines (such as MapReduce, for example) to enable easy programmability and to deliver massive scalability and high performance through advanced optimization. Massive batch process can be supported for a variety of data analysis and data mining applications over tens of thousands of computing machines. Complex event processing technology can be integrated into a cloud-scale query execution platform that supports distributed stream processing. An event model can be used to extend a declarative language to perform temporal analysis and to add implementations for temporal operators to the distributed and continuous stream processing.

Distributed Stream Processing in the Cloud

Figure 1A:
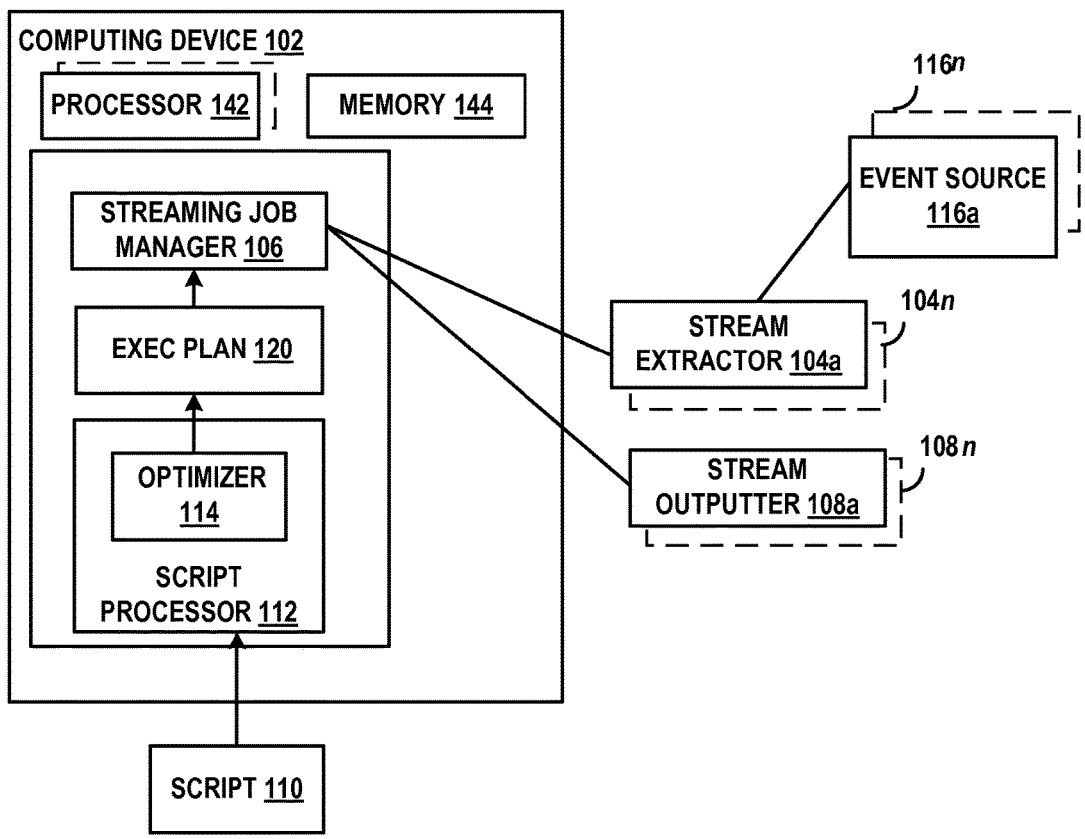
FIG. 1a illustrates an example of a system 100 that performs distributed stream processing in accordance with aspects of the subject matter described herein.

FIG. 1a illustrates an example of a system 100 comprising a system that performs distributed stream processing in accordance with aspects of the subject matter described herein. All or portions of system 100 may reside on one or more computers or computing devices such as the computers described below with respect to FIG. 3.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 may include any combination of: a script processor such as script processor 112, an optimizer such as optimizer 114 and/or a streaming job manager such as streaming job manager 106. Script processor 112 can compile a script, such as script 110. A script that is received by system 100 can include a sequence of commands. The commands can be data manipulation operators that take one or more event streams as input, perform some operation on the data and output an event stream. Users can name the output event stream. This capability can make it easier for the output stream to be consumed by subsequent operations. Script processor 112 can include or be associated with an optimizer such as optimizer 114. Optimizer 114 can create an optimized execution plan such as execution plan 120. Execution plan 120 can be an optimal parallel continuous execution plan. The optimal parallel continuous execution plan can execute on multiple computing devices. The execution plan can comprise a directed acyclic graph (DAG) of vertices. A vertex is a node in the graph.

A streaming job manager such as streaming job manager 106 can receive the optimized execution plan and can orchestrate query execution on one or more computing devices. The streaming job manager can create and monitor the vertices needed to execute the execution plan. In contrast to a batch-oriented job manager which schedules vertices at different times on demand, the streaming job manager 106 can schedule all the vertices in the DAG at the beginning of the execution.

Each vertex may execute on a separate computing device. Multiple vertices may be scheduled on the same computing device. A vertex of system 100 can be a stream extractor such as stream extractor 104a . . . stream extractor 104n that consumes events from one or more event sources such as event source 116a . . . event source 116n. A vertex of system 100 can be a stream outputter, such as stream outputter 108a . . . stream outputter 108n.

Each stream extractor vertex can continuously wait for its input streams and perform computations on the data. Results can be sent to downstream vertices through a network. The result can also be asynchronously buffered to a local store (not shown). Thus, a steam extractor can be implemented to generate events from various sources (such as event source 116a . . . event source 116n) that continuously produce events. Events from an input source can be labeled with a monotonically increasing sequence number. Sources that continuously produce events include but are not limited to sensors, sources that perform real-time logging, and the like. A stream extractor may be invoked from a query or script (e.g., script 110) written in a query language having temporal operators. The stream extractor may indicate temporal information for each event. Temporal information can include the time the event began (e.g., STARTTIME) and the time the event ended (e.g., ENDTIME). Temporal information can include a time period during which the event was active (e.g., duration) and/or any other information indicating time or sequence information and so on.

A vertex of system 100 can be a stream outputter. A stream outputter such as stream outputter 108a . . . stream outputter 108n can enable user-defined actions to create output event streams. A stream outputter may be invoked from a query or script (e.g., script 110) written in a query language having temporal operators. Events from an output source can be labeled with a monotonically increasing sequence number.

System 100 can support windowing. Windowing refers to the ability to define time windows and thus can define a subset of events using multiple windows. Time-based windows that may be supported include but are not limited to hopping, tumbling and snapshot windows. Hopping windows refers to windows that jump forward in time by a determined size. The windows can be controlled by two parameters: the hop size (e.g., referred to herein as "H") and the window size (e.g., referred to herein as "S". A new window of the size indicated by the window size parameter S can be created for every H units of time. Tumbling windows are a particular case of hopping windows with H=S, representing a sequence of gap-less and non-overlapping windows. The snapshot window boundaries are defined by the events. Whenever a new event arrives or an existing event expires, a new window boundary is introduced.

An example of a script as described herein follows:

```
VertexStartRawEvents =
    TEMPORALSTREAM    VertexGuid:string,
                                  CurrentTimeStamp:DateTime
    FROM "VertexStarted.log"
    USING StreamEventExtractor(...)
    STARTTIME CurrentTimeStamp;
VertexStartEvents =
    ALTERTIME VertexStartRawEvents
    WITH DURATION = TimeSpan.FromHours (6);
VertexEndEvents =
    TEMPORALSTREAM    VertexGuid:string,
                                  UserGroup:string,
                                  CurrentTimeStamp:DateTime
    FROM "VertexEnded.log"
    USING StreamEventExtractor(...)
    STARTTIME CurrentTimeStamp;
VertexEvents =
    SELECT UserGroup
    FROM VertexStartEvents CLIP JON VertexEndEvents
    ON VertextStart.VertexGuid == VertexEnd.VertexGuid
ResultEvents =
    SELECT UserGroup, COUNT( ) AS VertexCount
    FROM VertexEvents
    GROUP BY UserGroup
    WITH SNAPSHOTWINDOW;
    OUTPUT ResultEvents USING StreamEventOutputter(...);
```

The above example script performs continuous system diagnosis, although it will be appreciated by those of skill in the art that scripts can be used to perform various functions not limited to system diagnosis. In the script above, system logs that are continuously appended during the stream processing job execution are the input. VertexStarted and VertexEnded logs are used in the example (i.e., "FROM "VertexStarted.log"", "FROM "VertexEnded.log""). VertexStarted logs information when a vertex process starts to run. The information includes but is not limited to the vertex Guid and the time stamp when the vertex starts (i.e., "TEMPORALSTREAM VertexGuid:string, CurrentTimeStamp:DateTime"). Similarly, VertexEnded logs information when a vertex process terminates. The script calculates how many vertices are running at any time for each user group. The number of vertices running at any point in time is an estimate of the system resources used by each user group.

After converting the logs into events using stream extractors, VertexStarted and VertexEnded event streams can be correlated to determine how long each vertex was alive. The query language in which the query is written may provide the ability to modify the time intervals of the events in a stream. For example, in accordance with some aspects of the subject matter described herein, the start time of an event can be modified. For example, the command ALTERTIME <stream> QWITH STARTTIME=S, DURATION=D, where S is a date/time expression that specifies a new start time for an event and D is a timespan expression that specifies the duration of the event, the start time and duration of an event can be changed. The sample script above exploits the fact that a vertex does not run for more than 6 hours in the example system. The lifetime of a VertexStarted event is extended to a maximum of 6 hours (i.e., "ALTERTIME VertexStartRawEvents WITH DURATION=TimeSpan.FromHours (6);"). The VertexStarted event can be joined with corresponding VertexEnded event (i.e., "VertexEvents=SELECT UserGroup FROM VertexStartEvents CLIP JON VertexEndEvents ON VertextStart.VertexGuid==VertexEnd.VertexGuid"). The resulting event has a start time from the VertexStarted event and an end time from the VertexEnded event (its end time is clipped by the VertexEnded event). The final temporal grouping can count the number of vertices for each user group over snapshot windows. A snapshot aggregate can produce an event whenever the aggregated value for a group is changed (i.e., "ResultEvents=SELECT UserGroup, COUNT( ) AS VertexCount FROM VertexEvents GROUP BY UserGroup WITH SNAPSHOTWINDOW;". In the example above, an event is produced whenever a vertex in a user group starts or ends. The result can be used to estimate resource consumption per user group for the past period of time. In the example above, the result can be continuously written to disk (i.e., "OUTPUT ResultEvents USING StreamEventOutputter( . . . );").

The query language may include a comprehensive set of relation operators including but not limited to projections, filters, grouping, joins, etc. and can address the temporal aspects of events. For example, a temporal join may be able to evaluate an implicit temporal predicate so that events with overlapping time intervals can be evaluated.

As described above, a query or script can be received by a script processor such as script processor 112. Script processor 112 can compile script 110. An optimizer such as optimizer 114 can receive the compiled script and can evaluate alternative execution plans. For example, the optimizer may chose an execution plan based on any combination of: the lowest estimated cost based on available resources, data statistics and/or an internal cost model. Optimization can include consideration of the incoming data rate of temporal data. The optimizer can select a final execution plan (e.g., execution plan 120). The temporal data may be annotated by user stream extractors. The final execution plan can include a streaming DAG of vertices, in which each vertex can execute a series of runtime operators as described herein, including temporal joins, window aggregates and so on. Vertex computations can be deterministic so that failure handling and recovery can proceed properly, as described more fully below. Similarly the order of event consumption can be deterministic. In accordance with some aspects of the subject matter described herein, users can define actions that process event streams. Such actions may include writing to disk, consuming output event streams by a particular application and so on. Because users can define stream extractors, greater flexibility to consume input event streams in a variety of formats is provided. Because users can define stream outputters, greater flexibility to produce different forms of output event streams in a variety of formats is provided.

The execution plan can be received by the streaming job manager 106. The streaming job monitor 106 can orchestrate query execution. Streaming job manager 106 can create vertices on one or more computing devices and can monitor vertex execution. During execution, events from an input or output stream can be labeled with monotonically increasing sequence numbers. The progress of each vertex can be tracked by periodically notifying the streaming job manager of the sequence number associated with the last consumed or last produced event from each of the data streams. Periodically, each vertex may checkpoint its internal state to a store. The progress and checkpoint information can be transparent to users.

Figure 1B:
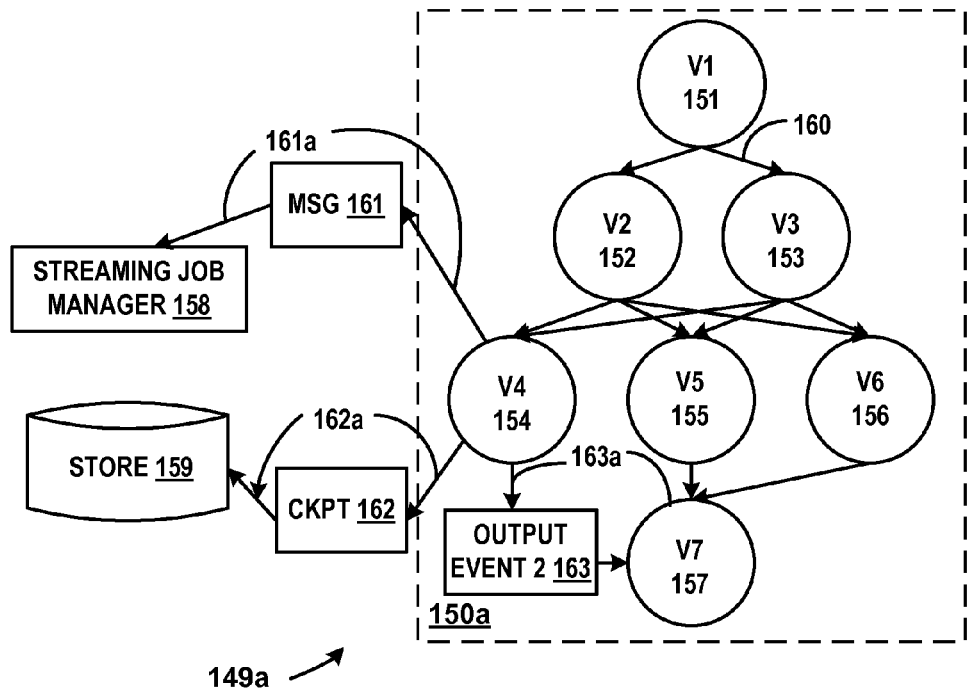
FIG. 1b illustrates an example of vertices whose execution is orchestrated by a streaming job manager in accordance with aspects of the subject matter described herein.

FIG. 1b illustrates an example 149a of execution of vertices. The DAG 150a represents a simplified execution graph including seven vertices, vertex v1 151, vertex v2 152, vertex v3 153, vertex v4 154, vertex v5 155, vertex v6 156 and vertex v7 157. When the job begins, let us assume for simplicity that the streaming job manager 158 dispatches each vertex to a different computing machine. It will be appreciated by one of skill in the art that it is possible to dispatch multiple vertices to a single computing machine. In DAG 150a edge 160 represents an output stream from vertex v1 151 to vertex v3 153 and an input stream to vertex v3 153 from vertex v1 151. When vertex v1 151 processes events, vertex v1 151 can send the output of the event to v2 152 and v3 153. Vertices v2 152 and v3 153 in turn can send their outputs to be processed by the downstream vertices v4 154, v5 155 and v6 156 and so on. Because the events are streaming events, this process is continuous. The vertices can send information to the streaming job manager to inform the streaming job manager of its progress using the assigned sequence numbers. For example, vertex v4 154 may send the streaming job manager 158 a dependency message 161. Arrow 161a indicates that vertex v4 154 sent the dependency message 161 to streaming job manager 158. The message can include a sequence number or series of sequence numbers that indicates the events that the vertex has processed. For example, the message {(2,3)} received by the streaming job manager 158 from vertex v4 154 can indicate that the vertex v4 154 has processed the second input event from vertex v2 152 and the third input event from vertex v3 153. The message {(2,3),(2)} received from vertex v4 154 can indicate that vertex v4 154 has also produced an output event 2 (output event 2 163) which vertex v4 154 sent to vertex v7 157. The arrow 163a represents that vertex 4 154 sent an output event to vertex 7 157.

The vertex may checkpoint its internal state to a store. For example, in FIG. 1b vertex v4 154 has sent a checkpoint 162 to the checkpoint store 159, indicated in FIG. 1b by arrow 162a. The vertex can notify the streaming job manager of the checkpoint and can associate event sequence numbers with the checkpoint. Checkpointing of user defined operators can also be supported at vertex checkpointing time. For example, suppose vertex v4 154 sends two messages to the streaming job manager. The first message e.g., {(2,3),(2)} can indicate that the vertex v4 154 consumed event 2 from vertex v2 152 and consumed event 3 from the vertex v3 153 and that vertex v4 154 generated output event 2. A second message {(5,6),(4),$s_t$} can indicate the progress information that vertex v4 154 processed event 5 from vertex v2 152 and event 6 from vertex v3 153 and that vertex v4 154 produced output event 4. The message can also include metadata information that indicates that at this point, vertex v4 154 generated a checkpoint $s_t$. Thus, if vertex v4 154 fails at this point, the streaming job manager 158 can determine which events were successfully processed by vertex v4 154 and which checkpoint is associated with this point in the vertex execution progress.

In response to detecting a vertex failure the streaming job manager can restart the failed vertex on a different computing machine. The stream job manager can reconfigure computation of the vertex by checking how far all the directly-connected downstream vertices have progressed and can calculate the minimum sequence number of events from which the new vertex should replay so that no events are missed because of the failure.

Figure 1C:
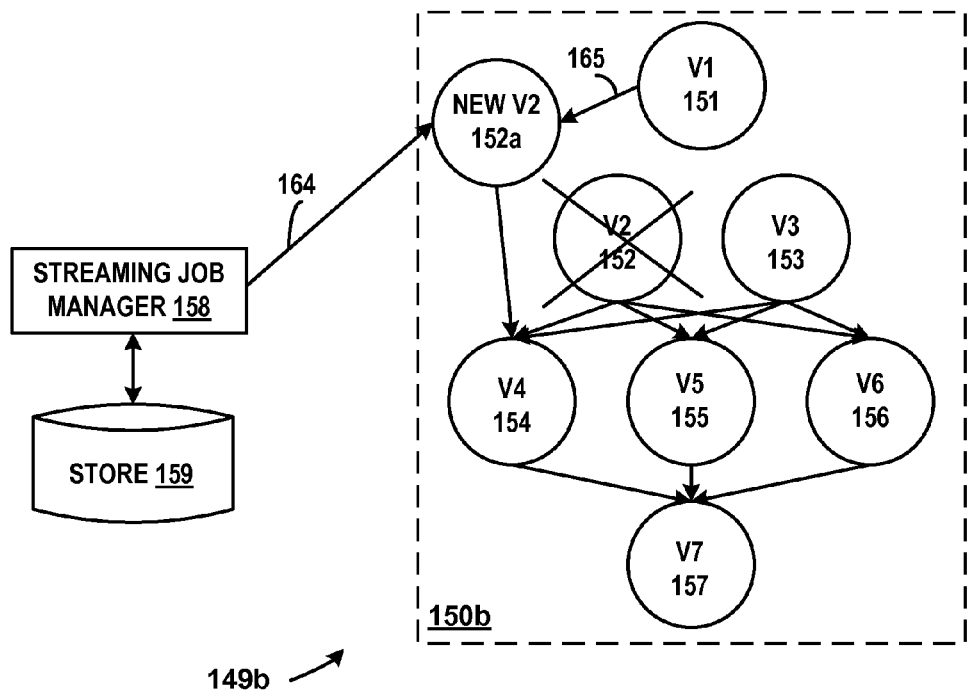
FIG. 1c illustrates the example of FIG. 1b in which one of the vertices has failed in accordance with aspects of the subject matter described herein.

FIG. 1c illustrates an example 149b of how a vertex failure can be handled. The DAG 150b represents a simplified execution graph including the seven vertices, vertex v1 151, vertex v2 152, vertex v3 153, vertex v4 154, vertex v5 155, vertex v6 156 and vertex v7 157 of FIG. 1b.

The progress and checkpoint information provided to the streaming job manager 158 and store 159 can be used to can track data dependencies which can be used to efficiently identify a recovery point from which to start recomputation. In failure recovery, the streaming job manager 158 can, for example, read from the checkpoint $s_t$ to reproduce the pre-failure state on another computing machine. The streaming job manager can restart the failed vertex on a different computing machine and reconfigure its computational state. Suppose, for example, vertex v2 152 fails during processing, illustrated by FIG. 1c. The streaming job manager can restart vertex 2 on a different computing machine, indicated in FIG. 1c by new vertex v2 152a. The internal state of the new vertex v2 152a has to be set to the last good known state so that the vertex v2 152a can continue processing without restarting the entire job. The streaming job manager can check all the directly-connected down-stream vertices for their progress and can calculate the minimum sequence number of events from which the new vertex should replay. In the example, the progress of vertices v4 154, v5 155 and v6 156 would be checked.

Suppose vertex v4 154 processed through event 5, vertex v5 processed through event 8 and vertex v6 processed through event 4. In order for processing to continue on vertices v4 154, v5 155 and v6 156, vertex v2 152's the output after event 4 has to be reproduced. The streaming job manager then uses this information to decide from which checkpoint to rerun for vertex v2 to make sure that the downstream vertices do not miss any events due to the failure. For example, when v2 152 failed, v4 154, v5 155 and v6 156 reported to have processed events 5, 8 and 4 respectively. The new instance of v2 152a has to regenerate events starting from event 5. The streaming job manager can then use this information to choose the most recent available checkpoint from which the vertex should recover to reproduce the output event 4, indicated in FIG. 1c by arrow 164. In addition to reconstructing its internal state from the checkpoint, the new vertex needs to reprocess inputs from the point associated with the checkpoint, indicated in FIG. 1c by arrow 165. It will be appreciated that each vertex can asynchronously write its outputs into a local store, which can be used to locate the event by its sequence number. If an input event cannot be reproduced (e.g., because the computing machine that stores the buffered result also failed, the streaming job manager can trigger a cascading failure on the upstream vertex, which can be processed as described above.

Duplicate events may occur because the new vertex may roll back to an earlier checkpoint. Each vertex can transparently eliminate any duplicate events using the input sequence numbers tracked locally. Duplicate elimination can also be performed for the final output. A process of garbage collection can be performed to safely remove obsolete tracking information, checkpoints and locally buffered intermediate events. After the output of the job is consumed or stored, there is a guarantee that there will be no requirement to recompute output events up to a particular sequence number. By traversing the DAG in a reverse topological order, the minimum input sequence numbers of events needed to perform any possible recomputation can be calculated for each vertex. Any event with a sequence number smaller than the minimum can be garbage collected. The process can terminate when it reaches the stream extractors.

Figure 2:
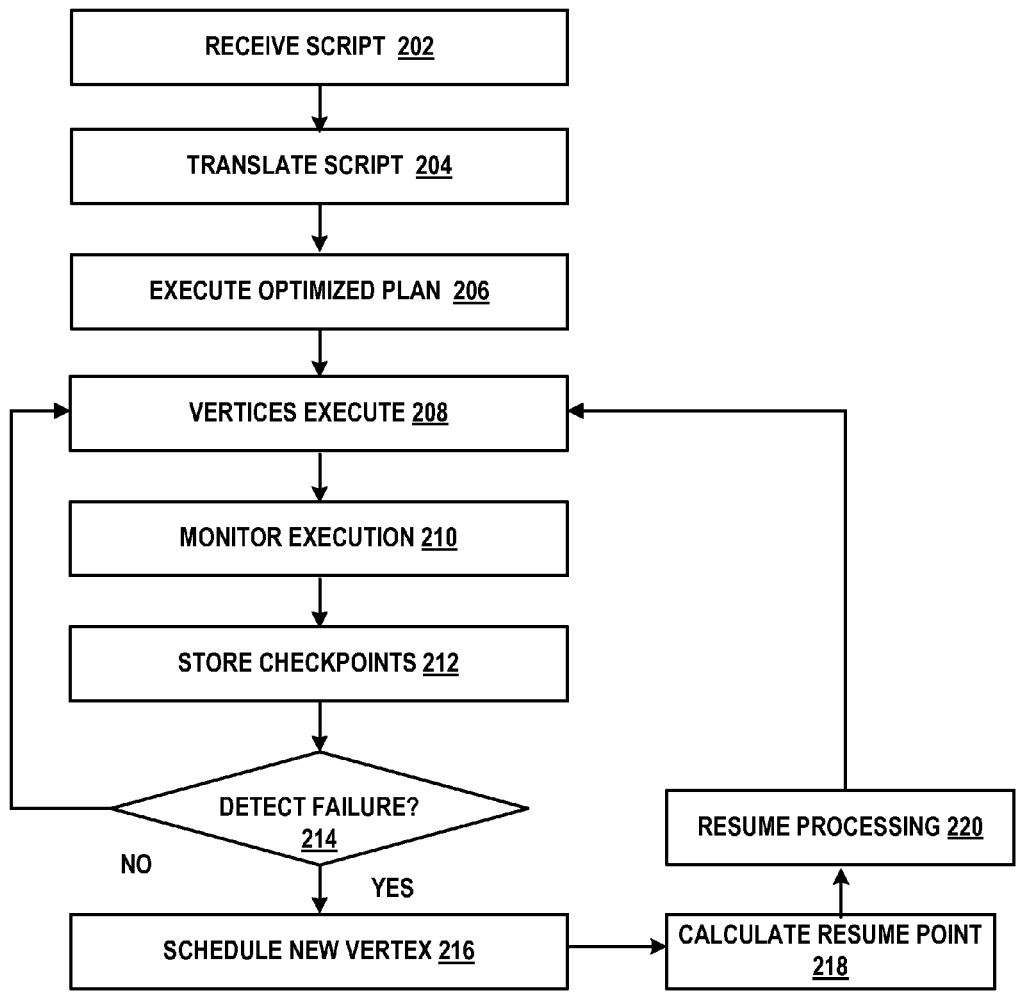
FIG. 2 illustrates an example of a method 200 comprising a method that performs distributed stream processing in accordance with aspects of the subject matter disclosed herein.

FIG. 2 illustrates an example of a method 200 for performing distributed stream processing in accordance with aspects of the subject matter described herein. The method described in FIG. 2 can be practiced by a system such as but not limited to the one described with respect to FIGS. 1a, 1b and 1c. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, at operation 202 a script written in a query language extended to support temporal analysis can be received. At operation 204 the script can be translated into a parallel continuous execution plan. The parallel continuous execution plan can be an optimal plan, where an optimal plan comprises a plan that is selected based on some combination of factors including one or more of: The parallel continuous execution plan may comprise a directed acyclic graph (DAG) of vertices. At operation 206 the execution plan can be orchestrated by a streaming job manager. The streaming job manager can schedule vertices on computing machines. At operation 208 the vertices may execute concurrently and continuously. At operation 210 the streaming job manager can monitor job execution. The progress of execution of each vertex can be tracked. The data dependencies of each vertex can be tracked. At operation 212 periodically checkpoints can be stored by the vertices. At operation 214 in response to detection of a failure of a vertex, recovery operations can be executed at 216. Otherwise, processing can continue at 208. At operation 216 another instance of the failed vertex can be scheduled. At operation 218 the optimal recovery point can be calculated as described more fully above. At operation 220 vertex execution can resume.

Example of a Suitable Computing Environment

Figure 3:
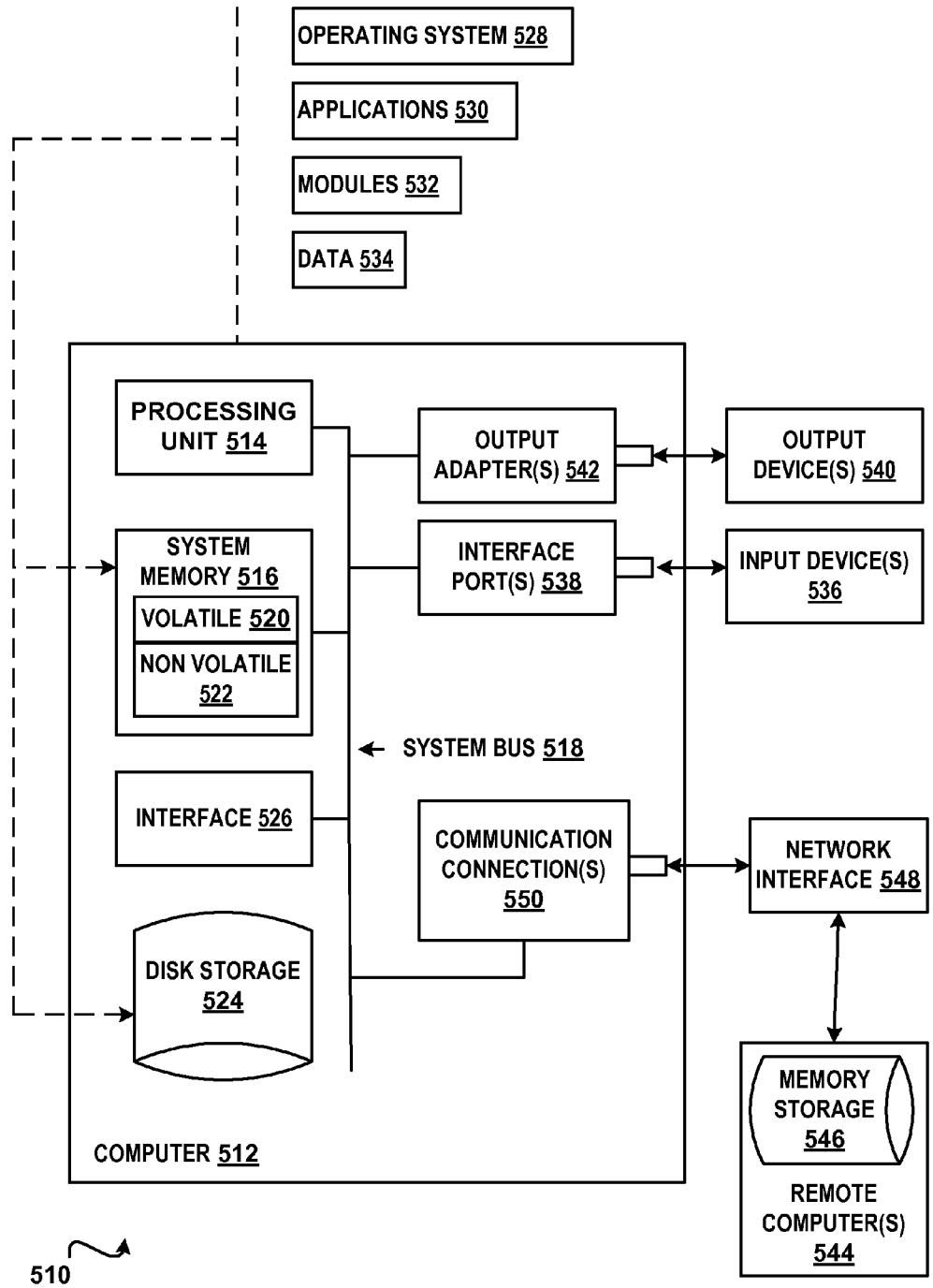
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
at least one processor:
a memory connected to the at least one processor; and
a cloud-scale query execution platform that supports distributed stream processing comprising a streaming job manager that monitors execution information about streaming jobs executed by a plurality of vertices executing on a plurality of computing devices, the streaming job manager receiving execution progress information and data dependencies for the plurality of vertices, each vertex of the plurality of vertices configured to process events associated with one or more streaming jobs, and each event being labeled with a sequence number used by at least the streaming job manager to describe and track dependencies between input, output and state of a vertex.

2. The system of claim 1, the streaming job manager scheduling a new vertex in response to detecting a failed vertex of the plurality of vertices, the streaming job manager determining a closest checkpoint from which to resume processing on the new vertex.

3. The system of claim 2, the streaming job manager calculating a minimum sequence number of event sequence numbers from which the new vertex resumes processing.

4. The system of claim 1, further comprising a script processor that receives a script written in a declarative query language, the declarative query language supporting distributed stream processing through temporal analysis of input event streams.

5. The system of claim 1, further comprising a streaming execution plan optimizer that receives a compiled script written in a declarative query language, the declarative query language having a capability to receive user-defined functions to consume event streams.

6. The system of claim 1, wherein the sequence number is assigned from a monotonically increasing sequence to an event of a plurality of events in an event stream.

7. The system of claim 1, wherein the execution platform assigns the sequence number to each of the events in an event stream.

8. A method comprising:
receiving by a processor of a computing device, execution progress information associated with a plurality of streaming jobs executed by a plurality of vertices executing on a plurality of computing devices, each vertex of the plurality of vertices configured to process events associated with one or more of the plurality of streaming jobs, and each event being assigned a sequence number that describes and tracks dependencies between input, output and state of at least one vertex of the plurality of vertices;
in response to detecting a vertex failure among the plurality of vertices, scheduling a new vertex; and
determining a closest checkpoint from which to resume processing on the new vertex from the sequence numbers assigned to the events in the streaming jobs.

9. The method of claim 8, further comprising:
performing failure recovery by calculating a minimum sequence number of event sequence numbers from which the new vertex resumes processing.

10. The method of claim 8, further comprising:
receiving a script in a query language extended to support distributed stream processing through temporal analysis of event streams; and
generating an optimized streaming execution plan from the script, the script comprising a stream extractor that converts information from a continuous input source into event streams.

11. The method of claim 8, further comprising:
receiving a script in a query language extended to support distributed stream processing through temporal analysis of event streams; and
generating an optimized streaming execution plan from the script, the script comprising a stream outputter that performs user-defined actions processing streaming output events.

12. The method of claim 8, further comprising:
receiving the sequence number associated with a last consumed or a last produced event from a vertex of the plurality of vertices.

13. The method of claim 8, wherein the sequence numbers are monotonically increasing sequence numbers.

14. A computer-readable storage medium comprising computer-readable instructions which when executed cause at least one processor of a computing device to:
receive data dependency information associated with a plurality of streaming jobs executed by a plurality of vertices executing on a plurality of computing devices, each vertex of the plurality of vertices configured to process events associated with one or more of the plurality of streaming jobs, and each event being assigned a sequence number that describes and tracks dependencies between input, output and state of at least one vertex of the plurality of vertices;
in response to detecting a vertex failure among the plurality of vertices, perform job recovery by scheduling a new vertex; and
determine a closest checkpoint from which to resume processing on the new vertex using the sequence numbers assigned to the events in one or more of the plurality of streaming jobs.

15. The computer-readable storage medium of claim 14, comprising further computer-readable instructions which when executed cause the at least one processor to:
calculate a minimum sequence number of event sequence numbers from which the new vertex resumes processing based on stored checkpointing data.

16. The computer-readable storage medium of claim 15, comprising further computer-readable instructions which when executed cause the at least one processor to:
generate an optimized streaming execution plan from a script written in a query language extended to support distributed stream processing through temporal analysis of input event streams.

17. The computer-readable storage medium of claim 14, comprising further computer-readable instructions which when executed cause the at least one processor to:
generate an optimized streaming execution plan from a script written in a query language having a capability to receive user-defined functions to consume event streams.

18. The computer-readable storage medium of claim 14, comprising further computer-readable instructions which when executed cause the at least one processor to:
generate an optimized streaming execution plan from a script written in a query language having a capability to receive user-defined functions to produce event streams.

19. The computer-readable storage medium of claim 14, comprising further computer-readable instructions which when executed cause the at least one processor to:
receive execution progress information comprising last event processed and last event produced from a vertex of the plurality of vertices.

20. The computer-readable storage medium of claim 19, comprising further computer-readable instructions which when executed cause the at least one processor to: assign a monotonically increasing sequence number to each event in an event stream.

* * * * *